United States Patent
Han et al.

(10) Patent No.: US 8,971,583 B2
(45) Date of Patent: Mar. 3, 2015

(54) DISTANCE MEASUREMENT APPARATUS AND METHOD

(71) Applicant: Industrial Technology Research Institute, Chutung, Hsinchu (TW)

(72) Inventors: Meng-Ju Han, New Taipei (TW); Cheng-Hua Wu, Hsinchu (TW); Ching-Yi Kuo, Kaohsiung (TW); Wei-Han Wang, Taipei (TW); Jwu-Sheng Hu, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 220 days.

(21) Appl. No.: 13/669,191

(22) Filed: Nov. 5, 2012

(65) Prior Publication Data

US 2013/0142395 A1    Jun. 6, 2013

(30) Foreign Application Priority Data

Dec. 1, 2011 (TW) .............................. 100144244 A

(51) Int. Cl.
*G06K 9/00* (2006.01)
(52) U.S. Cl.
USPC .......................................................... 382/106
(58) Field of Classification Search
None
See application file for complete search history.

(56) References Cited

U.S. PATENT DOCUMENTS

| | | | |
|---|---|---|---|
| 4,242,702 A * | 12/1980 | Kuni et al. ..................... 348/133 |
| 6,088,106 A * | 7/2000 | Rockseisen ................... 356/623 |
| 6,477,260 B1 * | 11/2002 | Shimomura ................... 382/106 |
| 7,375,826 B1 | 5/2008 | Lavelle et al. |
| 7,460,250 B2 * | 12/2008 | Keightley et al. ............. 356/625 |
| 7,599,528 B1 * | 10/2009 | Chaurasia ..................... 382/119 |
| 2004/0246495 A1 | 12/2004 | Abe |
| 2008/0013103 A1 | 1/2008 | Inoue et al. |
| 2008/0165357 A1 * | 7/2008 | Stern et al. .................... 356/364 |
| 2009/0040532 A1 * | 2/2009 | Kawasaki et al. ............. 356/610 |
| 2009/0231570 A1 | 9/2009 | Toda et al. |

(Continued)

FOREIGN PATENT DOCUMENTS

| | | |
|---|---|---|
| CN | 101947962 A | 1/2011 |
| CN | 102072718 A | 5/2011 |

(Continued)

OTHER PUBLICATIONS

Konolige, et al., "A Low-Cost Laser Distance Sensor", IEEE International Conference on Robotics and Automation, May 19-23, 2008, pp. 3002-3008.

(Continued)

*Primary Examiner* — Vu Le
*Assistant Examiner* — Samah Beg
(74) *Attorney, Agent, or Firm* — Muncy, Geissler, Olds & Lowe, P.C.

(57) ABSTRACT

A distance measurement apparatus and a distance measurement method are provided. The apparatus includes a line-shaped laser transmitter, an image sensing device and a processing unit. The line-shaped laser transmitter transmits a line-shaped laser, and the image sensing device senses the line-shaped laser to output a line-shaped laser image. The processing unit receives the line-shaped laser image, and segments the line-shaped laser image into several sub-line-shaped laser images. The processing unit further calculates a vertical position for a laser line in each sub-line-shaped laser image, and outputs each distance information according to the corresponding sub-line-shaped laser image and a transformation relation.

16 Claims, 7 Drawing Sheets

(56) References Cited

U.S. PATENT DOCUMENTS

| | | | |
|---|---|---|---|
| 2010/0189307 A1* | 7/2010 | Yada et al. | 382/106 |
| 2010/0195915 A1* | 8/2010 | Ueno et al. | 382/202 |
| 2013/0050710 A1* | 2/2013 | Yamaguchi et al. | 356/610 |
| 2014/0098218 A1* | 4/2014 | Wu et al. | 348/118 |
| 2014/0168368 A1* | 6/2014 | Doucet et al. | 348/46 |

FOREIGN PATENT DOCUMENTS

| | | |
|---|---|---|
| JP | 2005221336 | 8/2005 |
| WO | WO 03/002935 | 1/2003 |
| WO | WO 2009/012474 | 1/2009 |
| WO | WO 2010/150515 | 12/2010 |

OTHER PUBLICATIONS

Wu, et al., "Applications of the Integrated High-Performance CMOS Image Sensor to Range Finders—from Optical Triangulation to the Automotive Field", Sensors, 2008, pp. 1719-1739.

"Image Type Distance Measurement of Bright Spot Projection Method", National Symposium on System Science and Engineering Conference, Jun. 6-7, 2008, 6 pages.

Li, "Laser Ranging Study in the luban ruler integration", a Thesis submitted to Institute of Electro-Optical and Materials Science, College of Electrical and Computer Engineering, Jun. 2010, National Formosa University, 77 pages.

*A Study of Active speedy shape reconstruction system*, pp. 1-59, Jul. 2001 (with abstract on p. 3).

* cited by examiner

DISTANCE MEASUREMENT APPARATUS AND METHOD

This application claims the benefit of Taiwan application Serial No. 100144244, filed Dec. 1, 2011, the disclosure of which is incorporated by reference herein in its entirety.

TECHNICAL FIELD

The disclosure relates in general to a measurement apparatus and method, and more particularly to a distance measurement apparatus and method.

BACKGROUND

Distance measurement modules have long been a crucial technique in industrial applications, and are prevalent in applications including mobile robots, automated-guided vehicles (AGVs), product line inspections and industrial safety gratings. According to measuring techniques, current non-contact distance sensors are segmented into two types—a time of flight estimation method and a triangulation location method. The time of flight estimation method usually provides preferred accuracy and viewable angle than the triangulation location method. However, for calculating a time that light needs for traveling to and fro, the time of flight estimation method requires highly precise and extremely costly mechanism designs.

For applications of AGVs and safety gratings, the precision and viewable angle for sensing distance information are usually not regulated by strict standards. It infers that, when products based on the time of flight are adopted for the applications of AGVs and safety gratings, these over-qualified products are rather utilized for less significant positions such that implementation costs are in equivalence wasted.

SUMMARY

The disclosure is directed to a distance measurement apparatus and method.

According to one embodiment, a distance measurement apparatus is provided. The apparatus includes a line-shaped laser transmitter, an image sensing device and a processing unit. The line-shaped laser transmitter transmits a line-shaped laser, and the image sensing device senses the line-shaped laser to output a line-shaped laser image. The processing unit receives the line-shaped laser image, and segments the line-shaped laser image into several sub-line-shaped laser images. The processing unit further calculates a vertical position for a laser line in an $i^{th}$ $i^{th}$ sub-line-shaped laser image, and outputs $i^{th}$ distance information according to the $i^{th}$ sub-line-shaped laser image and a transformation relation. Wherein, i is a positive integer.

According to another embodiment, a distance measurement method is provided. The method includes steps of: receiving a line-shaped laser image; segmenting the line-shaped laser image into several sub-line-shaped laser images; calculating a vertical position for a laser line in $i^{th}$ an sub-line-shaped laser image; and outputting distance information according to the $i^{th}$ sub-line-shaped laser image and a transformation relation. Wherein, i is a positive integer.

Figure 1:
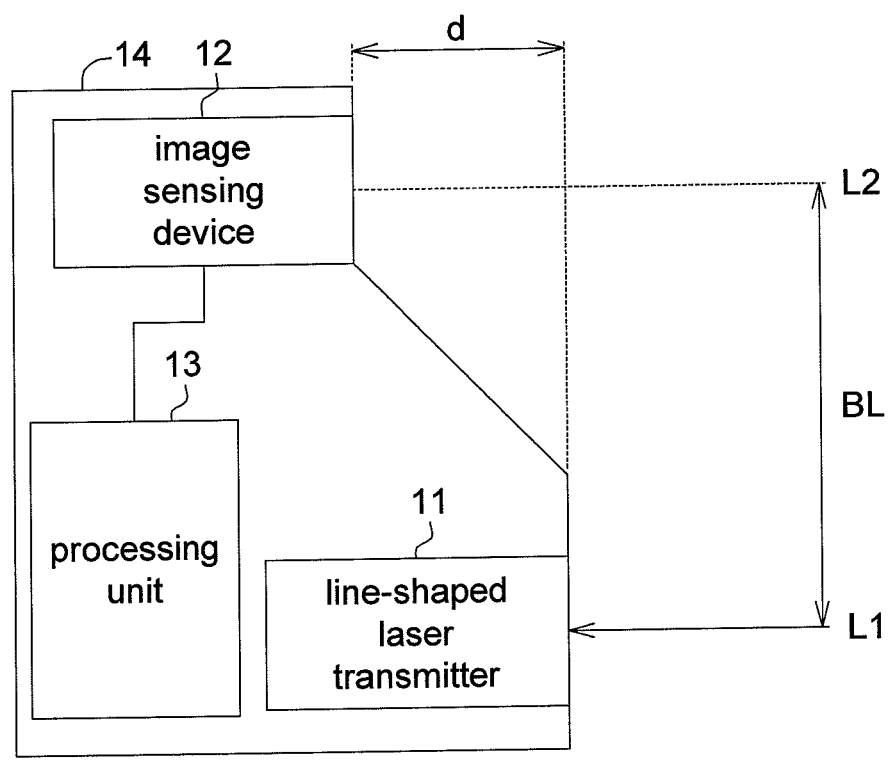
FIG. 1 is a block diagram of a distance measurement apparatus.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 2:
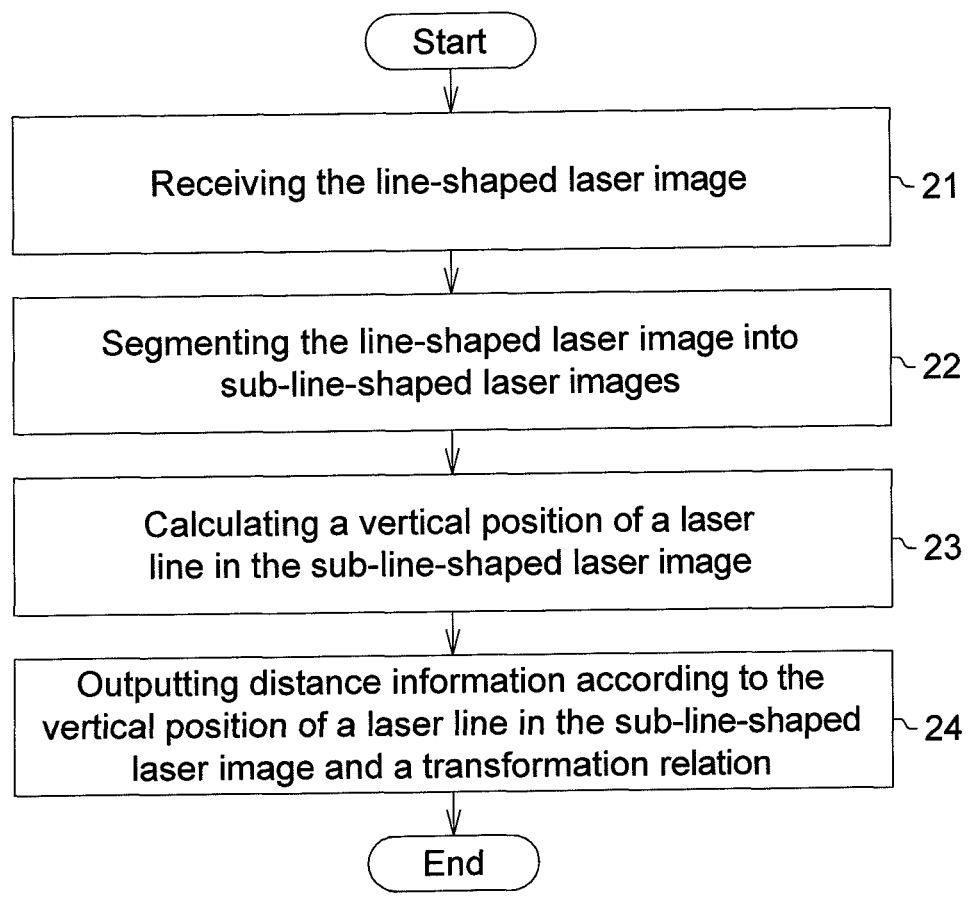
FIG. 2 is a flowchart of a distance measurement method.
Figure 3:
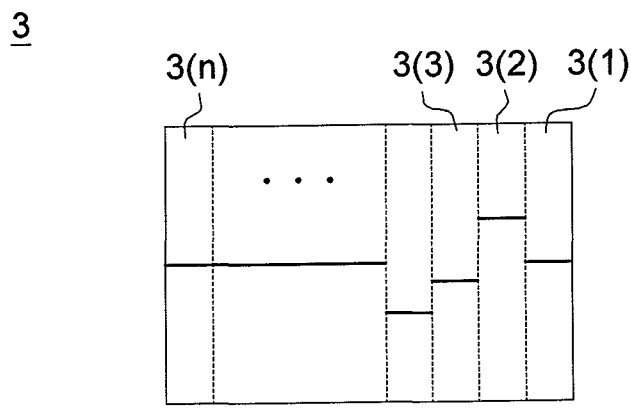
FIG. 3 is a schematic diagram of segmenting a line-shaped laser image into several sub-line-shaped laser images.
Figure 4:
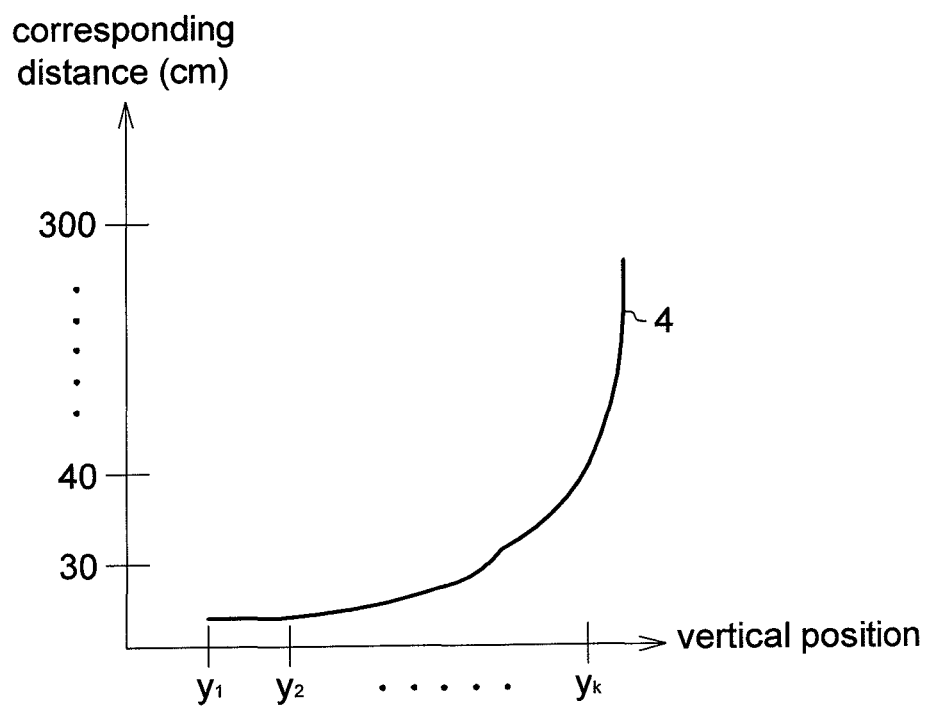
FIG. 4 is a schematic diagram of a relation curve of the vertical position for a laser line in a sub-line-shaped laser image and a corresponding distance.
Figure 8:
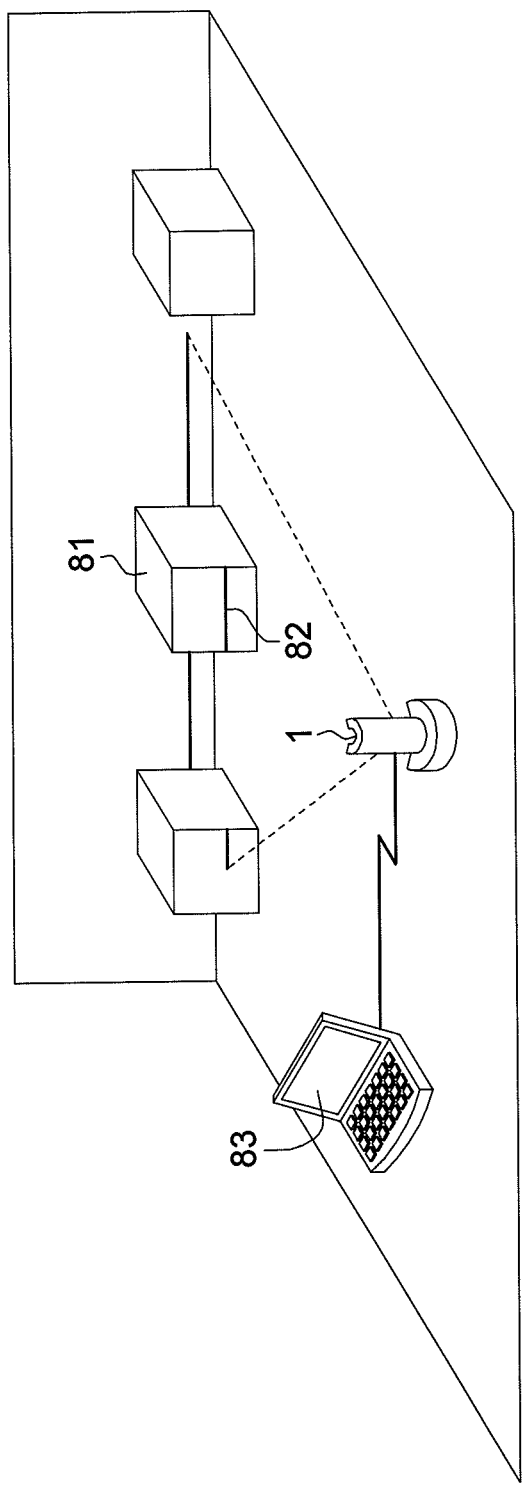
FIG. 8 is a schematic diagram of a distance measurement apparatus for measuring an object under test.

FIG. 1 shows a block diagram of a distance measurement apparatus. FIG. 2 shows a flowchart of a distance measurement method. FIG. 3 shows a schematic diagram of segmenting a line-shaped laser image into several sub-line-shaped laser images. FIG. 4 shows a schematic diagram of a relation curve of the vertical position for a laser line in the sub-line-shaped laser image and a corresponding distance. FIG. 8 shows a schematic diagram of a distance measurement apparatus for measuring an object under test. Referring to FIGS. 1, 2, 3, 4, and 8, a distance measurement apparatus 1 is coupled to a computer 83, which is capable of recording distance information generated by the distance measurement apparatus 1. The distance measurement apparatus 1, applicable to a mobile platform, includes a line-shaped laser transmitter 11, an image sensing device 12, a processing unit 13 and a housing 14. The line-shaped laser transmitter 11 transmits a line-shaped laser 82 to an object 81 under test. The image sensing device 12, coupled to the processing unit 13, senses the line-shaped laser 82 to output a line-shaped laser image 3. In one embodiment, the line-shaped laser 82 is parallel to a horizontal plane, e.g., the ground. The housing 14 accommodates the line-shaped laser transmitter 11, the image sensing device 12 and the processing unit 13.

A distance measurement method, applicable to the distance measurement apparatus 1, includes the steps below. In Step 21, the processing unit 13 receives the line-shaped laser image 3. In Step 22, the processing unit 13 segments the line-shaped laser image 3 into a plurality of sub-line-shaped laser images 3(1) to 3(n), where n is a positive integer. In Step 23, the processing unit 13 calculates a vertical position for a laser line in an $i^{th}$ sub-line-shaped image of the sub-line-shaped laser images 3(1) to 3(n), where i is a positive integer and 1≤i≤n.

In Step 24, the processing unit 13 outputs $i^{th}$ distance information according to the vertical position for a laser line in the $i^{th}$ sub-line-shaped image and a transformation relation, such as relation curve 4 of the vertical position for a laser line in the sub-line-shaped laser image and a corresponding distance in FIG. 4. For example, the $i^{th}$ distance information is a distance between the distance measurement apparatus 1 and an object under test. Alternatively, the processing unit 13 outputs other distance information according to the $i^{th}$ distance information, the vertical position for a laser line in another sub-line-shaped image and a trigonometric function. For example, according to the $i^{th}$ distance information, a trigonometric function and the vertical position for a laser line in a $j^{th}$ sub-line-shaped laser image 3(j) of the sub-line-shaped laser images 3(1) to 3(n), the processing unit 13 outputs $j^{th}$ distance information, where j is a positive integer and not equal to i.

When the distance measurement apparatus 1 and the distance measurement method are applied to a mobile platform, measuring errors resulted from moving the mobile platform can be reduced. Further, since the line-shaped laser transmitter utilized in the distance measurement apparatus 1 and the distance measurement method adopts a line-shaped light source rather than a dot light source, multiple sets of distances information can be obtained through one distance measuring process to increase the amount of distance information per unit time.

Figure 5A:
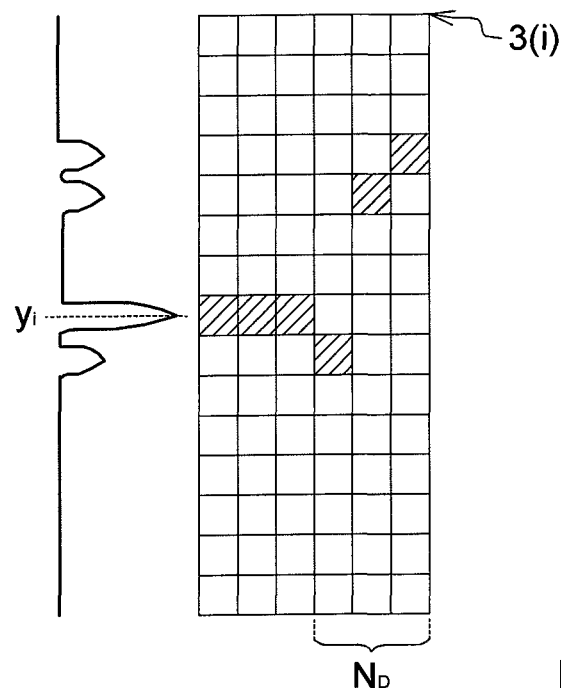
FIG. 5A is a schematic diagram of a sub-line-shaped laser image.
Figure 5B:
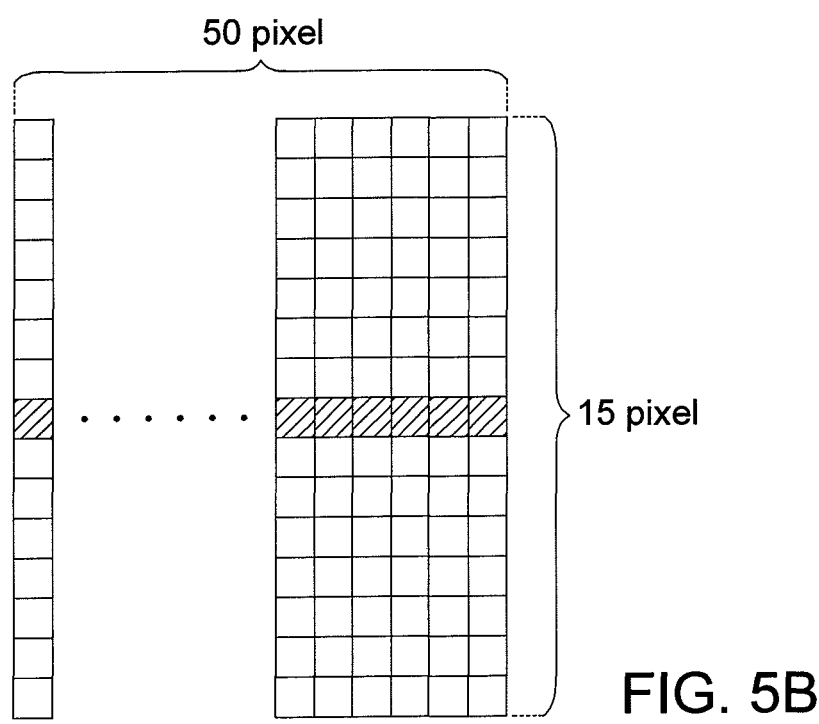
FIG. 5B is a schematic diagram of an ideal sub-line-shaped laser image without noise.
Figure 5C:
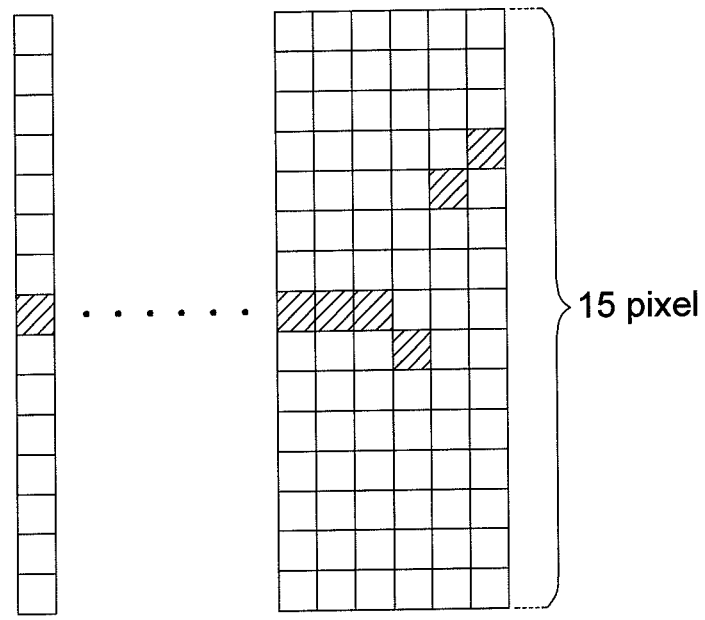
FIG. 5C is a schematic diagram of a practical sub-line-shaped laser image with noise.

FIG. 5A shows a schematic diagram of a sub-line-shaped laser image. FIG. 5B shows a schematic diagram of an ideal sub-line-shaped laser image without noise. FIG. 5C shows a schematic diagram of a practical sub-line-shaped laser image with noise. Referring to FIGS. 1, 3, 5A, 5B and 5C, in principle, a line-shaped laser image without noise is as shown in FIG. 5B, with light spots being successively located in a continuously manner on a same horizontal position. However, as the brightness changes or is affected by the environment, a line-shaped laser image actually sensed may appear as that shown in FIG. 5C, with three discontinuous light spots on the right being noise.

The foregoing processing unit 13 adaptively, continuously segments the line-shaped laser image 3 according to the laser lines in the line-shaped image 3. In other words, according to the laser lines in the line-shaped laser image 3, the processing unit 13 adaptively segments the line-shaped laser image 3 into the sub-line-shaped laser images 3(1) to 3(n). The width of the sub-line-shaped laser images 3(1) to 3(n) may vary due to different obstacle of the application environment. For example, the processing unit 13 determines whether a change occurs in the height of the laser lines. The processing unit 13 segments successive regions having the same vertical position for a laser line into one sub-line-shaped laser image. When the vertical position for a laser line changes, the processing unit 13 starts counting from a disconnected position of the laser line, and segments following successive regions having the same vertical position for a laser line into another sub-line-shaped laser image. Further, the processing unit 13 may also equally segments the line-shaped laser image 3 into the sub-line-shaped images 3(1) to 3(n) having an equal width. For example, according to a width W of the line-shaped laser image 3 and a maximum tolerable noise width $N_D$, the processing unit 13 determines the number n of the sub-line-shaped laser images 3(1) to 3(n). The number n of the sub-line-shaped laser images 3(1) to 3(n) equals $$\frac{W}{2N_D}.$$

It should be noted that, pixels where the noise occurs in the line-shaped laser image 3 are unlikely to successively locate at a same horizontal position. Therefore, to prevent the noise from being misjudged as a line-shaped laser, the maximum tolerable noise width $N_D$ may be appropriately defined in practical applications. When the number of a plurality of successive light spots in the sub-line laser image is greater than or equal to the maximum tolerable noise width $N_D$, the processing unit 13 determines that these light spots are a part of the line-shaped laser. Conversely, when the number of successive light spots in the sub-line laser image is not greater than the maximum tolerable noise width $N_D$, the processing unit 13 determines that these light spots are not a part of the line-shaped laser. For example, the maximum tolerable noise width $N_D$ equals 3. When the number of successive light spots in the sub-line laser image is greater than or equal to 3, the processing unit 13 determines that the light spots are a part of the line-shaped laser. Conversely, when the number of successive light spots in the sub-line laser image is not greater than 3, the processing unit 13 determines that these light spots are not a part of the line-shaped laser. Accordingly, by segmenting the line-shaped laser image 3 into the sub-line-shaped laser images 3(1) to 3(n), noise interference may be further reduced.

The processing 13 performs a histogram calculation along a vertical direction of the $i^{th}$ sub-line-shaped laser image 3(i) to obtain a vertical position $y_i$ for a laser line in the $i^{th}$ sub-line-shaped laser image 3(i). For example, shaded areas in the $i^{th}$ sub-line-shaped laser image 3(i) in FIG. 5A represent pixels having a higher grayscale. Along the vertical direction of the $i^{th}$ sub-line-shaped laser image 3(i), the processing unit 13 performs a histogram calculation for a sum of grayscales of pixels of each row. When the sum of grayscales of a particular row is greater than the sum of grayscales of other rows, it means that the sum of grayscale of this particular row is the highest. That is, the laser line is located on the pixels of this row.

Figure 6:
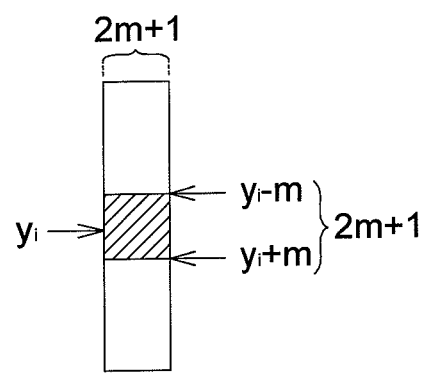
FIG. 6 is a schematic diagram of calculating a vertical position for a laser line by utilizing a brightness center algorithm.

FIG. 6 shows a schematic diagram of calculating a vertical position for a laser line by utilizing a brightness center algorithm. In another embodiment, to optimize the position accuracy, the processing unit 13 calculates the vertical position for a laser line by further adopting a brightness center algorithm. The processing unit 13 regards the vertical position $y_i$ for a laser line obtained from the foregoing histogram calculation as a center, and selects a region having $(2m+1) \times (W/n)$ pixels according to the center. According to coordinates and the brightness of the pixels in this region, the processing unit 13 obtains a coordinate of a laser light spot through an approach similar to calculating for a center of gravity. The first sub-line-shaped laser image 3(1) is taken as an example for calculating the brightness center:

$$X_c = \frac{\sum_{i=1}^{W/n} \sum_{j=y_1-m}^{y_1+m} [x_i \times I(x_i, y_j)]}{\sum_{i=1}^{W/n} \sum_{j=y_1-m}^{y_1+m} I(x_i, y_j)} \quad \text{Equation (1)}$$

$$Y_c = \frac{\sum_{i=1}^{W/n} \sum_{j=y_1-m}^{y_1+m} [y_j \times I(x_i, y_j)]}{\sum_{i=1}^{W/n} \sum_{j=y_1-m}^{y_1+m} I(x_i, y_j)} \quad \text{Equation (2)}$$

In Equations (1) and (2), $(X_c, Y_c)$ represents the coordinate of the calculated brightness center, W is the width of the laser image 3, n is the number of the sub-line-shaped laser images, m is a positive integer, $y_1$ is the y-axis height of the laser line of the first sub-line-shaped laser image obtained from the histogram calculation, $(x_i, y_i)$ is the coordinate in the region of (2m+1)×(W/n) pixels, and $l(x_i, y_i)$ is the corresponding brightness value. The processing unit 13 further replaces the vertical position $y_i$ for a laser line with the coordinate of the brightness center Yc, and determines the distance to the object under test according to the coordinate Yc of the brightness center. The coordinates of the brightness centers of the second sub-line-shaped laser image 3(2) to the $n^{th}$ sub-line-shaped laser image 3(n) may be similarly calculated as above.

Figure 7:
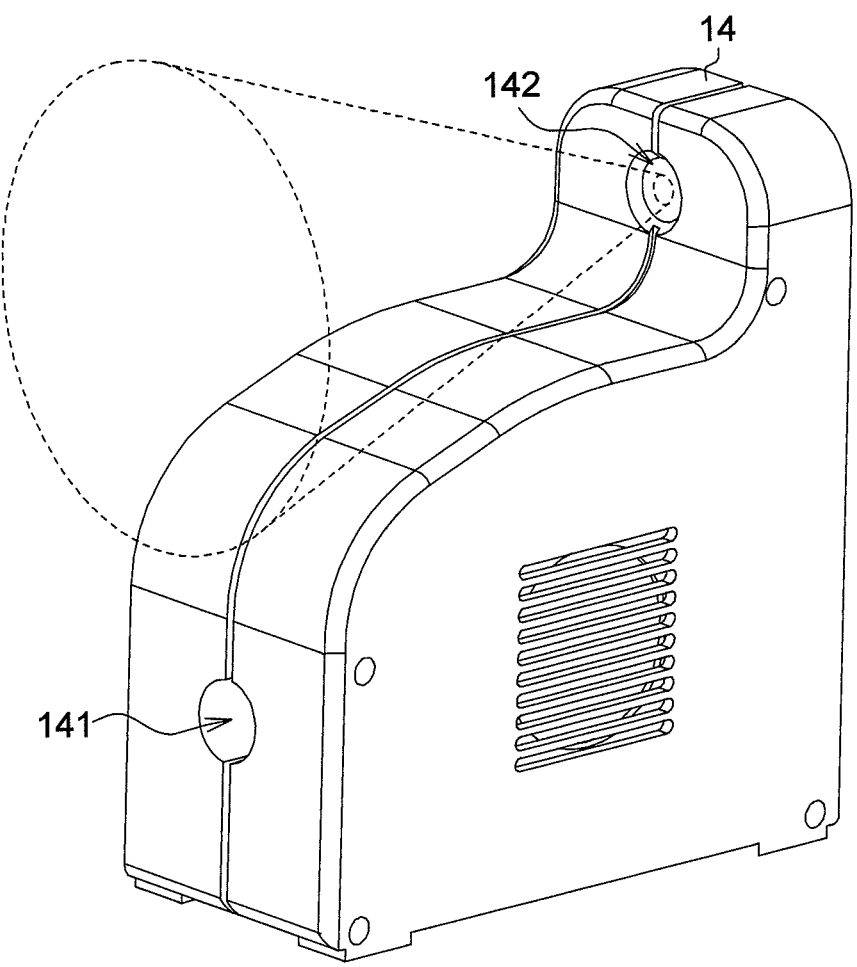
FIG. 7 is a lateral view of a distance measurement apparatus.

Please referring to FIGS. 1 and 7, FIG. 7 shows a lateral view of a distance measurement apparatus. Further, an optical axis L1 of the foregoing line-shaped laser transmitter 11 and an optical axis L2 of the image sensing device 12 are parallel to each other and are located on a same vertical plane perpendicular to the line-shaped laser. A distance BL between the optical axis L1 of the line-shaped laser transmitter 11 and the optical axis L2 of the image sensing device 12 is smaller than or equal to 10 cm. The foregoing housing 14 has a line-shaped laser opening 141 and an image sensing opening 142. The line-shaped laser opening 141 and the image sensing opening 142 are located from each other by a horizontal distance d, which may be adjusted according to a viewable angle range of the image sensing device 12. For example, when the viewable angle range is 60 degrees, the horizontal distance d needs to provide an angle formed between a line connecting the line-shaped laser opening 141 and the image sensing opening 142 and the optical axis of the image sensing device 12 to be greater than 30 degrees.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A distance measurement apparatus, comprising:
   a line-shaped laser transmitter, for transmitting a line-shaped laser;
   an image sensing device, for sensing the line-shaped laser to output a line-shaped laser image; and
   a processing unit, for receiving the line-shaped laser image, segmenting the line-shaped laser image into a plurality of sub-line-shaped laser images, calculating the vertical position for a laser line in an $i^{th}$ sub-line-shaped laser image, and outputting $i^{th}$ distance information according to the $i^{th}$ sub-line-shaped laser image and a transformation relation, i being a positive integer,
   wherein the processing unit outputs $j^{th}$ distance information according to the $i^{th}$ distance information, a trigonometric function and the vertical position for a laser line in a $j^{th}$ sub-line-shaped laser image of the sub-line-shaped laser images, where j is a positive integer not equal to i.

2. The distance measurement apparatus according to claim 1, wherein the processing unit equally segments the line-shaped laser image.

3. The distance measurement apparatus according to claim 2, wherein the processing unit determines a number of the sub-line-shaped laser images according to a width of the line-shaped laser image and a maximum tolerable noise width.

4. The distance measurement apparatus according to claim 3, wherein the number of the sub-line-shaped laser images equals the width of the line-shaped laser image divided by twice the maximum tolerable noise width.

5. The distance measurement apparatus according to claim 1, wherein the processing unit continuously and adaptively segments the line-shaped laser image according to laser lines in the line-shaped laser image.

6. The distance measurement apparatus according to claim 1, wherein the processing unit performs a histogram calculation along a vertical direction of the $i^{th}$ sub-line-shaped laser image to obtain the vertical position of a laser line in the $i^{th}$ sub-line-shaped laser image.

7. The distance measurement apparatus according to claim 1, wherein an optical axis of the line-shaped transmitter and an optical axis of the image sensing device are parallel to each other and are located on a same vertical plane.

8. The distance measurement apparatus according to claim 7, wherein the line-shaped laser image and the vertical plane are perpendicular to each other.

9. The distance measurement apparatus according to claim 1, further comprising:
   a housing, for accommodating the line-shaped laser transmitter, the image sensing device and the processing unit, the housing having a line-shaped laser opening and an image sensing opening, the line-shaped laser opening and the image sensing opening being located from each other by a horizontal distance, an angle formed between a line connecting the line-shaped laser opening and the image sensing opening and the optical axis of the image sensing device being greater than 30 degrees.

10. A distance measurement method, comprising:
    receiving a line-shaped laser image;
    segmenting the line-shaped laser image into a plurality of sub-line-shaped laser images;
    calculating the vertical position for a laser line in an $i^{th}$ sub-line-shaped laser image of the sub-line-shaped laser images; and
    outputting $i^{th}$ distance information according to the $i^{th}$ sub-line-shaped laser image and a transformation relation, i being a positive integer,
    wherein the calculating step outputs $j^{th}$ distance information according to the $i^{th}$ distance information, a trigonometric function and a vertical position for a laser line in a $j^{th}$ sub-line-shaped laser image of the sub-line-shaped laser images, where j is a positive integer and not equal to i.

11. The distance measurement method according to claim 10, wherein the segmenting equally segments the line-shaped laser image.

12. The distance measurement method according to claim 10, wherein the segmenting step determines a number of the sub-line-shaped laser images according to a width of the line-shaped laser image and a maximum tolerable noise width.

13. The distance measurement method according to claim 12, wherein the number of the sub-line-shaped laser images equals the width of the line-shaped laser image divided by twice the maximum tolerable noise width.

14. The distance measurement method according to claim 10, wherein the segmenting step adaptively segments the line-shaped laser image according to continuity between laser lines in the line-shaped laser image.

15. The distance measurement method according to claim 10, wherein the calculating and analyzing step performs a histogram calculation along a vertical direction of the $i^{th}$ sub-line-shaped laser image to obtain the vertical position for a laser line in the $i^{th}$ sub-line-shaped laser image.

16. The distance measurement method according to claim 10, wherein the line-shaped laser image is sensed by an image sensing device.

* * * * *